United States Patent
Nandakumar et al.

(10) Patent No.: US 10,771,239 B2
(45) Date of Patent: Sep. 8, 2020

(54) BIOMETRIC THREAT INTELLIGENCE PROCESSING FOR BLOCKCHAINS

(71) Applicant: International Business Machines Corporation, Armonk, NY (US)

(72) Inventors: Karthik Nandakumar, Singapore (SG); Nalini K. Ratha, Yorktown Heights, NY (US); Sharathchandra Pankanti, Fairfield County, CT (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 15/955,966

(22) Filed: Apr. 18, 2018

(65) Prior Publication Data

US 2019/0327079 A1    Oct. 24, 2019

(51) Int. Cl.
| | | |
|---|---|---|
| H04L 29/06 | (2006.01) | |
| H04L 9/06 | (2006.01) | |
| H04L 9/32 | (2006.01) | |
| G06F 21/55 | (2013.01) | |
| G06F 21/32 | (2013.01) | |

(52) U.S. Cl.
CPC ............ *H04L 9/0637* (2013.01); *G06F 21/32* (2013.01); *G06F 21/55* (2013.01); *H04L 9/3231* (2013.01); *H04L 9/3265* (2013.01); *H04L 63/0861* (2013.01)

(58) Field of Classification Search
CPC ... H04L 9/0637; H04L 9/3231; H04L 9/3265; H04L 63/0861; G06F 21/32; G06F 21/55
See application file for complete search history.

(56) References Cited

U.S. PATENT DOCUMENTS

| | | | |
|---|---|---|---|
| 7,809,791 B2 | 10/2010 | Schwartz et al. | |
| 9,509,690 B2 | 11/2016 | Carter et al. | |
| 10,034,174 B1* | 7/2018 | Tuomikoski | H04L 67/26 |
| 10,572,641 B1* | 2/2020 | Griffin | G06F 21/32 |

(Continued)

FOREIGN PATENT DOCUMENTS

WO     2005041057 A1     5/2005

OTHER PUBLICATIONS

"Volume-1-Tag-Cyber-Security-Annual-Fifty-Controls", Lead Author—Dr. Edward G. Amoroso, "Bug bounty services will grow substantially, as more companies—including small ones—agree to pay for reported weaknesses. One might expect that Bitcoin will become the anonymous currency of choice, which bodes well or anyone willing to be flexible in his regard. Furthermore, block chain-°©-based solutions can help arbitrate the time-°©-value of vulnerabilities by proving who identified an issue first." (see p. 194). Sep. 2016.

*Primary Examiner* — Sarah Su

(57) ABSTRACT

An example operation may include one or more of detecting a suspected biometric authentication incident, submitting a first blockchain transaction including a first report to a blockchain network, submitting a second blockchain transaction including a second report to the blockchain network, and taking an action, by one or more blockchain nodes, in response to determining one or more of the first and second reports are relevant to the one or more blockchain nodes. The first report includes public and private data corresponding to the suspected biometric authentication incident, and the second report includes one or more of a root cause and mitigation steps for the incident.

20 Claims, 11 Drawing Sheets

(56) References Cited

U.S. PATENT DOCUMENTS

| | | | |
|---|---|---|---|
| 2012/0249328 A1* | 10/2012 | Xiong | G10L 15/22 |
| | | | 340/541 |
| 2014/0133714 A1* | 5/2014 | Ivanov | G06K 9/00013 |
| | | | 382/124 |
| 2016/0275461 A1* | 9/2016 | Sprague | H04L 63/126 |
| 2016/0366174 A1 | 12/2016 | Chernin et al. | |
| 2017/0070480 A1 | 3/2017 | Blumenfeld et al. | |
| 2017/0099313 A1 | 4/2017 | Singuru | |
| 2017/0116463 A1* | 4/2017 | Beaudet | G06K 9/00288 |
| 2017/0187741 A1 | 6/2017 | Desch et al. | |
| 2017/0214701 A1 | 7/2017 | Hasan | |
| 2017/0257358 A1* | 9/2017 | Ebrahimi | H04L 9/3247 |
| 2017/0272469 A1 | 9/2017 | Kraemer et al. | |
| 2018/0121923 A1* | 5/2018 | Uhr | G06Q 20/3829 |
| 2018/0183766 A1* | 6/2018 | Crabtree | H04L 9/3239 |
| 2018/0255090 A1* | 9/2018 | Kozloski | H04L 63/1416 |
| 2019/0068367 A1* | 2/2019 | Baughman | G06F 17/10 |
| 2019/0141054 A1* | 5/2019 | Signorini | G06F 21/64 |
| 2019/0213462 A1* | 7/2019 | McDonald | G06Q 30/018 |
| 2019/0268159 A1* | 8/2019 | High | H04L 63/105 |
| 2019/0268277 A1* | 8/2019 | Asthana | H04L 9/0894 |
| 2019/0328227 A1* | 10/2019 | Eades | A61B 5/0024 |
| 2019/0334912 A1* | 10/2019 | Sloane | G06F 16/23 |
| 2019/0340269 A1* | 11/2019 | Biernat | G06F 16/248 |
| 2019/0357049 A1* | 11/2019 | Tali | G06F 21/36 |
| 2020/0019680 A1* | 1/2020 | Frederick | H04L 9/3247 |

* cited by examiner

108

BIOMETRIC THREAT INTELLIGENCE PROCESSING FOR BLOCKCHAINS

TECHNICAL FIELD

This application generally relates to blockchain networks, and more particularly, to biometric threat intelligence processing on a distributed ledger (such as a blockchain).

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, biometric security attacks are managed locally within an organization, and response is limited to what is locally known. As such, what is needed is a multi-organization blockchain network to respond more effectively to biometric attacks and overcome these limitations.

SUMMARY

One example embodiment may provide a method that includes one or more of detecting a suspected biometric authentication incident, submitting a first blockchain transaction including a first report to a blockchain network, submitting a second blockchain transaction including a second report to the blockchain network, and taking an action, by one or more blockchain nodes, in response to determining one or more of the first and second reports are relevant to the one or more blockchain nodes. The first report includes public and private data corresponding to the suspected biometric authentication incident, and the second report includes one or more of a root cause and mitigation steps for the incident.

Another example embodiment may provide a system that includes a blockchain network including first and second blockchain nodes. The first blockchain node is configured to detect a suspected biometric authentication incident, submit a first blockchain transaction including a first report to the blockchain network, and take an action, in response to determining one or more of the first and a second report are relevant to the first blockchain node. The first report includes public and private data corresponding to the suspected biometric authentication incident. The second blockchain node is configured to submit a second blockchain transaction including the second report to the blockchain network. The second report includes one or more of a root cause and mitigation steps for the incident.

A further example embodiment may provide a non-transitory computer readable medium including instructions, that when read by a processor, cause the processor to perform one or more of detecting a suspected biometric authentication incident, submitting a first blockchain transaction including a first report to a blockchain network, submitting a second blockchain transaction including a second report to the blockchain network, and taking an action, by one or more blockchain nodes, in response to determining one or more of the first and second reports are relevant to the one or more blockchain nodes. The first report includes public and private data corresponding to the suspected biometric authentication incident, and the second report includes one or more of a root cause and mitigation steps for the incident.

DETAILED DESCRIPTION

Figure 1A:
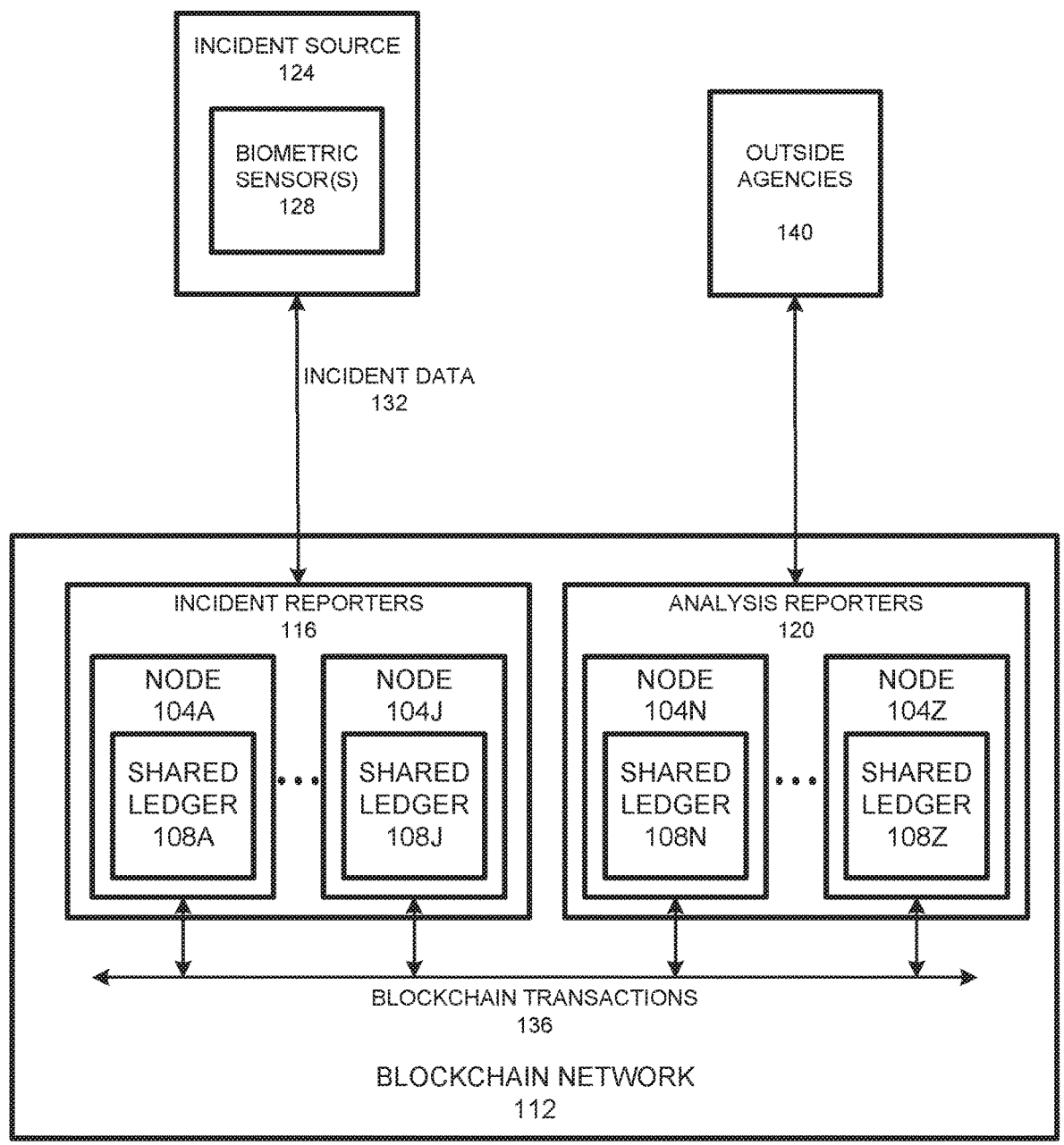
FIG. 1A illustrates a network diagram of an incident processing system with a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling. Example embodiments provide methods, devices, networks and/or systems, which provide biometric threat intelligence processing for blockchains.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Biometric systems are vulnerable to number of adversarial attacks including presentations attacks, attacks on biometric template, and hill-climbing attacks. When such attacks are detected, the incident is often managed locally or within the affected organization. However, the adversaries typically attempt to reuse a similar modus operandi across multiple biometric endpoints. Unlike other IT systems, attacks on biometric systems can be strongly interrelated due to overlap of identities, common modality, common sensors, etc. Therefore, early detection, reporting, and sharing of suspicious incidents is essential for effectively containing the security threats.

Most IT threat intelligence systems are centralized and provide "anonymous and verifiable" channels for reporting & sharing security incidents. While existing centralized solutions can provide anonymity (identity of the affected entity is known only to the trusted central authority) & verifiability (other entities in the network can verify that the report comes one of the members of the network), they require that only trusted entities are allowed in to the network. Otherwise, adversaries can manipulate the system by reporting fake incidents and clearing their tracks. Since adversaries are likely to target the weakest links in the system (and attacks on different biometric systems can be strongly inter-related), inclusion of the not-so-trusted entities is critical for early detection of attacks. Hence, a mechanism to ensure immutability of incident reports & a strong audit trail to prevent adversaries from gaming the threat intelligence system is needed.

FIG. 1A illustrates a logic network diagram of an incident processing system in a blockchain, according to example embodiments. Referring to FIG. 1A, the network 100 includes a blockchain network 112, which includes blockchain nodes 104. The blockchain nodes 104 represent various organizations associated with reporting and analyzing biometric security threats, and are considered well-defined organizations. Since the participants in the blockchain network 112 are well-defined organizations, the blockchain network 112 is most commonly a permissioned blockchain. However, a public blockchain (e.g., Ethereum) could also be used for this purpose with suitable modifications. Although smart contracts are not specifically mentioned with respect to the aspects of the present application described herein, smart contracts could be a critical component in some embodiments. For instance, there may be regulatory requirements on reporting of suspected biometric authentication incidents, remedial action taken, etc. and these could be enforced through blockchain smart contracts.

The blockchain nodes 104 are generally grouped as incident reporters 116 and analysis reporters 120. Incident reporters 116 receive incident data 132 from incident sources 124, create incident reports (first reports), and submit incident reports as blockchain transactions 136. Once the blockchain transactions 136 are validated, they are added to the shared ledger 108 associated with each blockchain node 104. FIG. 1A illustrates blockchain nodes 104A-104J (and corresponding shared ledgers 108A-108J, respectively) as incident reporters 116. Analysis reporters 120 review the incident reports from the shared ledgers 108, create various reports (second reports), and submit the various reports as blockchain transactions 136. Once the blockchain transactions 136 are validated, they are added to the shared ledger 108 associated with each blockchain node 104. FIG. 1A illustrates blockchain nodes 104N-104Z (and corresponding shared ledgers 108N-108Z, respectively) as analysis reporters 120. There may be any number of incident reporters 116 and analysis reporters 120 in blockchain network 112. In some embodiments, a blockchain node 104 may be both an incident reporter 116 as well as an analysis reporter 120. In some embodiments, analysis reporters 120 may use one or more outside agencies 140 outside the blockchain network 112 to provide further analysis of the incident data 132 and perhaps a more complete analysis for a report.

Five types of blockchain transactions 136 are contemplated herein: (1) record an incident report on the blockchain, (2) record a root cause analysis report on the blockchain, (3) record mitigation steps or procedures on the blockchain, (4) record an action taken report (ATR) on the blockchain, and (5) issue threat alerts and recommendations on the blockchain. (1) and (4) are generally recorded by incident reporters 116, and (2), (3), and (5) are generally recorded by analysis reporters 120. The third-party security agencies and other biometric vendors can read (provided they have the appropriate access rights) blockchain transactions 136 related to incident reports, root cause analysis, mitigation steps, and action taken reports. Based on this received information, they can perform analytics and determine if there are any threat alerts and recommendations to be issued. If there are, such threat alerts and recommendations are in turn recorded on the blockchain for the benefit of other participants or nodes 104. The threat alerts and recommendations would typically come from third-party security agencies and other biometric vendors. However, in some embodiments law enforcement agencies or regulatory organizations may issue such alerts and recommendations based on some other additional intelligence that may be available exclusively to them.

An incident source 124 is an organization that includes one or more biometric sensors 128 in order to authenticate human users conducting financial or purchase transactions or any other action that may require biometric authentication. Although only one incident source 124 is illustrated, it should be understood that there may be any number of incident sources 124 in incident processing system 100. An incident source 124 may either be external to a blockchain network 112, as shown, or may be a node 104 within the blockchain network 112, including an incident reporter 116 or an analysis reporter 120.

Biometric sensors 128 include fingerprint sensors, iris sensors, facial recognition sensors, or any type of sensor that measures human traits and compares with a known template in order to authenticate a specific human user with the incident source 124. Incident sources 124 include any organization that uses biometric security features, and includes, but is not limited to banks and government organizations. When the incident source 124 suspects a user of biometric sensors 128 of possibly using fraudulent or dishonest means to gain biometric authentication, the incident source 124 provides incident data 132 automatically to one or more incident reporters 116 of the blockchain network 112.

The present application describes a blockchain-based solution to manage adversarial attacks on biometric systems in a secure and privacy-preserving manner. Four types of participants are described herein, who form the nodes 104 of the blockchain network 112: biometric vendors (analysis reporters 120), organizations which have deployed biometric systems (incident sources 124 and/or incident reporters 116), third-party security intelligence companies (analysis reporters 120), and law enforcement & other relevant government agencies (analysis reporters 120). Biometric vendors supply hardware (biometric sensors 128) and/or software (the algorithms required for processing the sensed signals and perform biometric matching). If there is any adversarial threat to the biometric system, the biometric vendors may need to update the hardware and/or software to counter the threat (as a taken action 455, for example). Third-party security intelligence companies are those that monitor all security-related incidents/events, analyze these events, detect potential threats or ongoing attacks, propose/develop countermeasures, etc. For example, in the cybersecurity world, companies collect information about all malware/viruses and provide recommendations to other enterprises to mitigate the threats.

The described solution includes four main characteristics: anonymous reporting and sharing of suspected incidents by affected organizations, analysis of reported incidents by the vendors and third-party security companies to determine threat level, sharing of recommendations/countermeasures to mitigate the threat, and automated computation of trust scores for the reporting organizations. One of the main motivations for anonymous reporting is to protect the reputation of the affected organization. Another motivation could be to protect the affected organization from further attacks until a fix is found. Even if the source of a suspected incident is anonymous, if the countermeasure is made publicly available on the blockchain, the affected organization could get back the necessary information by reading the blockchain.

Figure 1B:
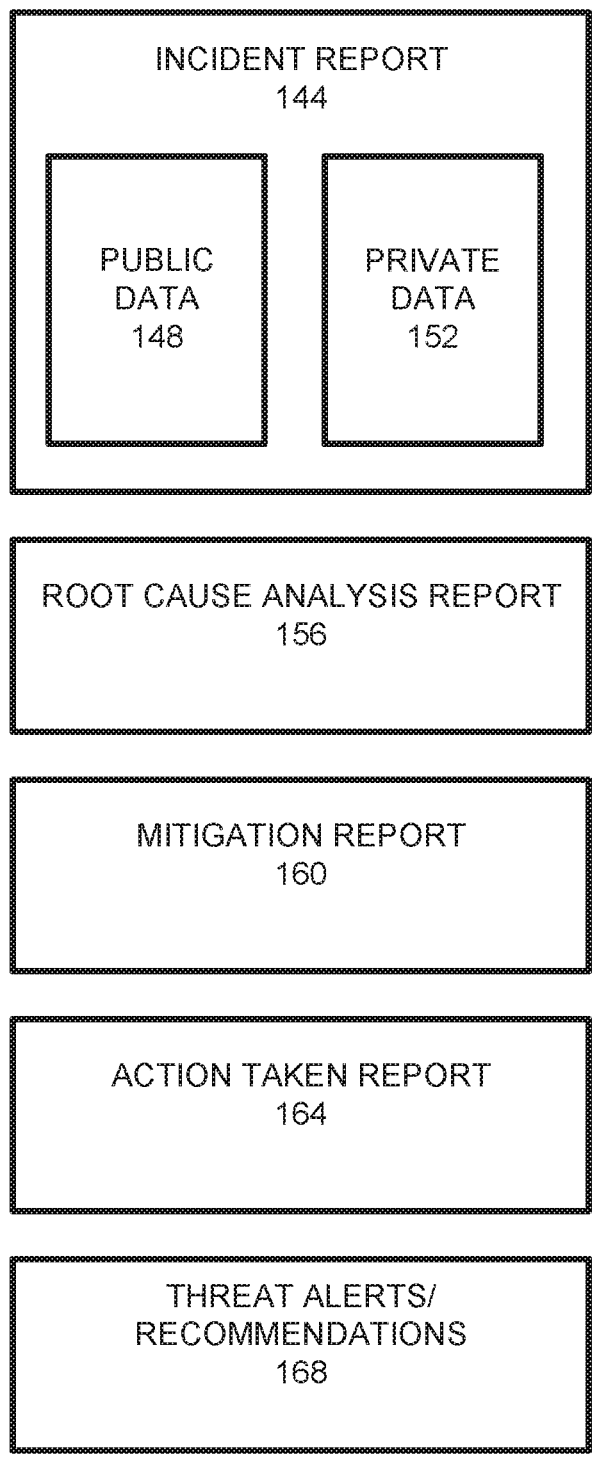
FIG. 1B illustrates a diagram of shared ledger reports, according to example embodiments.

FIG. 1B illustrates a diagram of shared ledger 108 reports, according to example embodiments. Referring to FIG. 1B, the shared ledger 108 reports include incident reports 144. Incident reports 144 are created by incident reporters 116 based on received incident data 132. Incident reports 144 include both public 148 and private 152 data. Public data 148 is non-sensitive incident details used by analysis reporters 120 to determine a root cause of a biometric security threat or mitigation steps to prevent or reduce the chance of a future incident. Private data 152 includes sensitive incident details such as a name of the incident source 124, location of an incident, or identification of a supplier or provider of biometric sensors 128. In some embodiments, private data 152 is encrypted, and only blockchain nodes 104 having the proper encryption keys may read the private data 152.

Shared ledger 108 reports may include root cause analysis reports 156, which assign a root cause for a reported suspected biometric incident. Shared ledger 108 reports may also include mitigation reports 160, which recommend mitigation steps to prevent or reduce the impact of a future suspected biometric authorization incident. Shared ledger 108 reports may also include action taken reports 164, which describe actions taken by an incident source 124 or incident reporter 116 as a result of the suspected biometric authentication incident. Shared ledger 108 reports may also include threat alerts or recommendations 168 or trust scores, which may be created for all participants or nodes 104 of the blockchain network 112 and recorded on the blockchain.

Figure 2A:
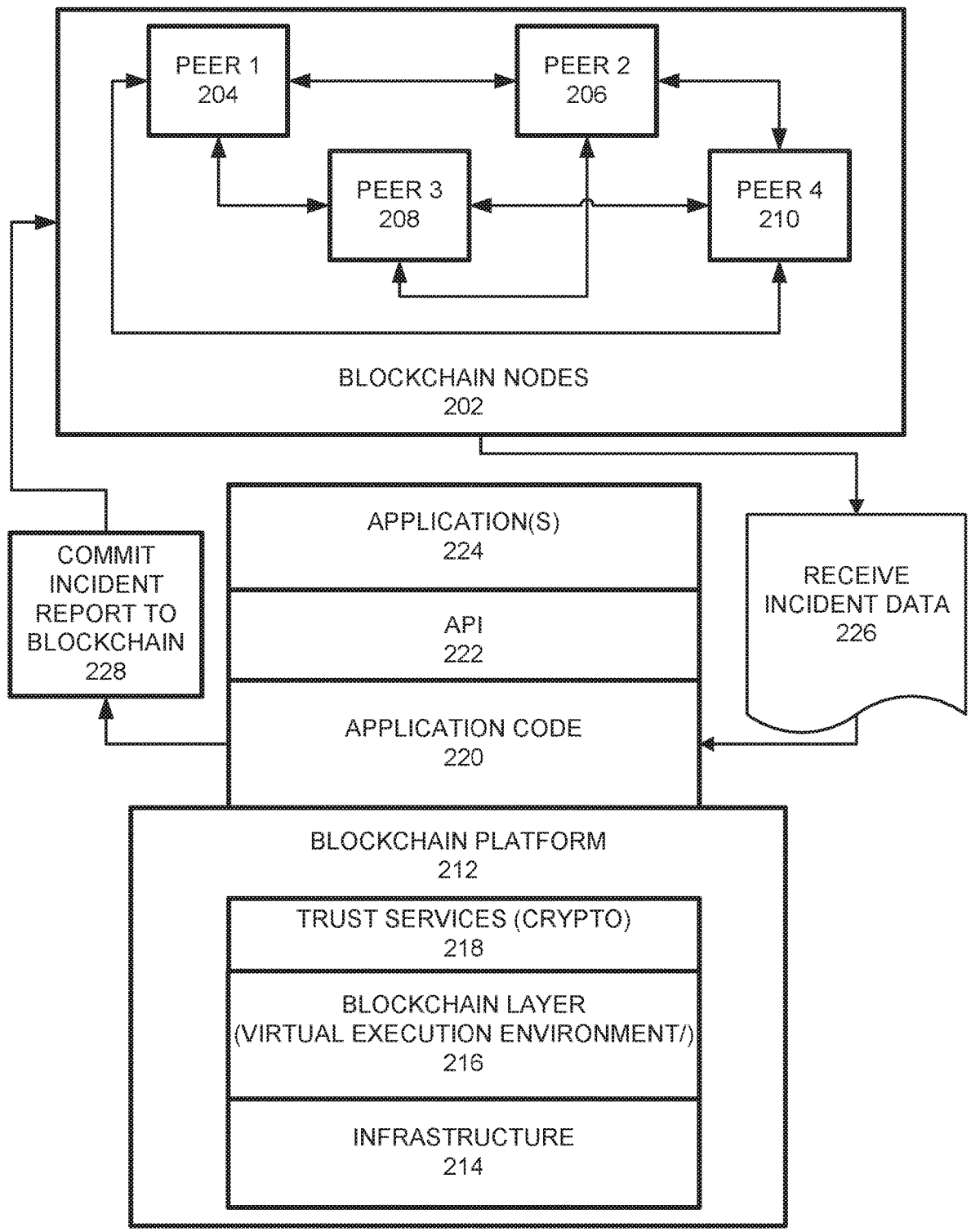
FIG. 2A illustrates an example peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, incident data 226 may be received from an incident source 124 may be processed by one or more processing entities (e.g., virtual machines) included in the blockchain layer 216. The incident report 228 is recorded to the shared ledger 108, and may include incident data 226 formatted into separate fields including public data 148 and private data 152. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a blockchain node 202 receives incident data 226, which includes sensitive and non-sensitive data related to a suspected biometric authentication incident from an incident source 124. One function may be to create and submit an incident report including the incident data as a blockchain transaction, which may be provided to one or more of the nodes 204-210.

Figure 2B:
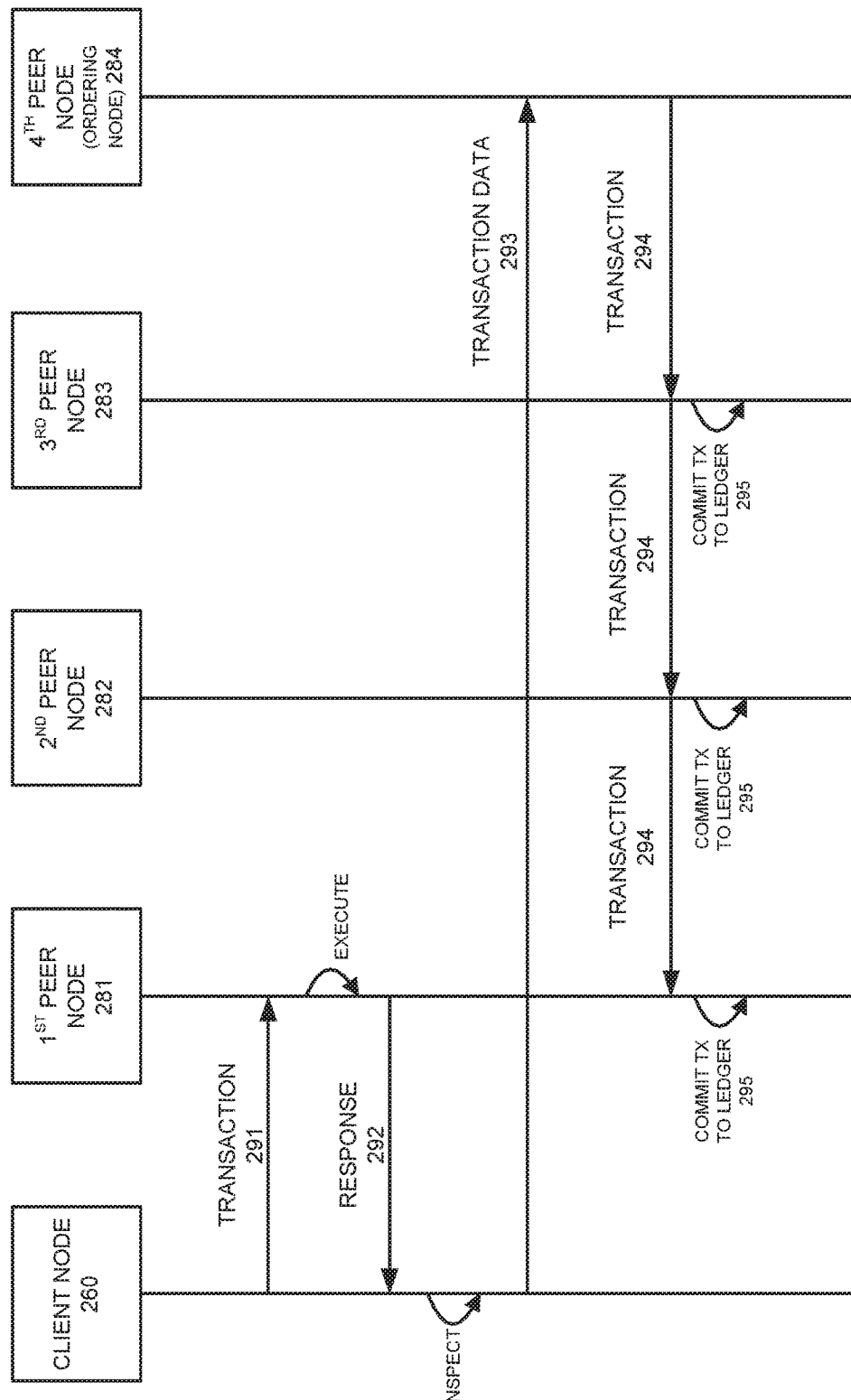
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
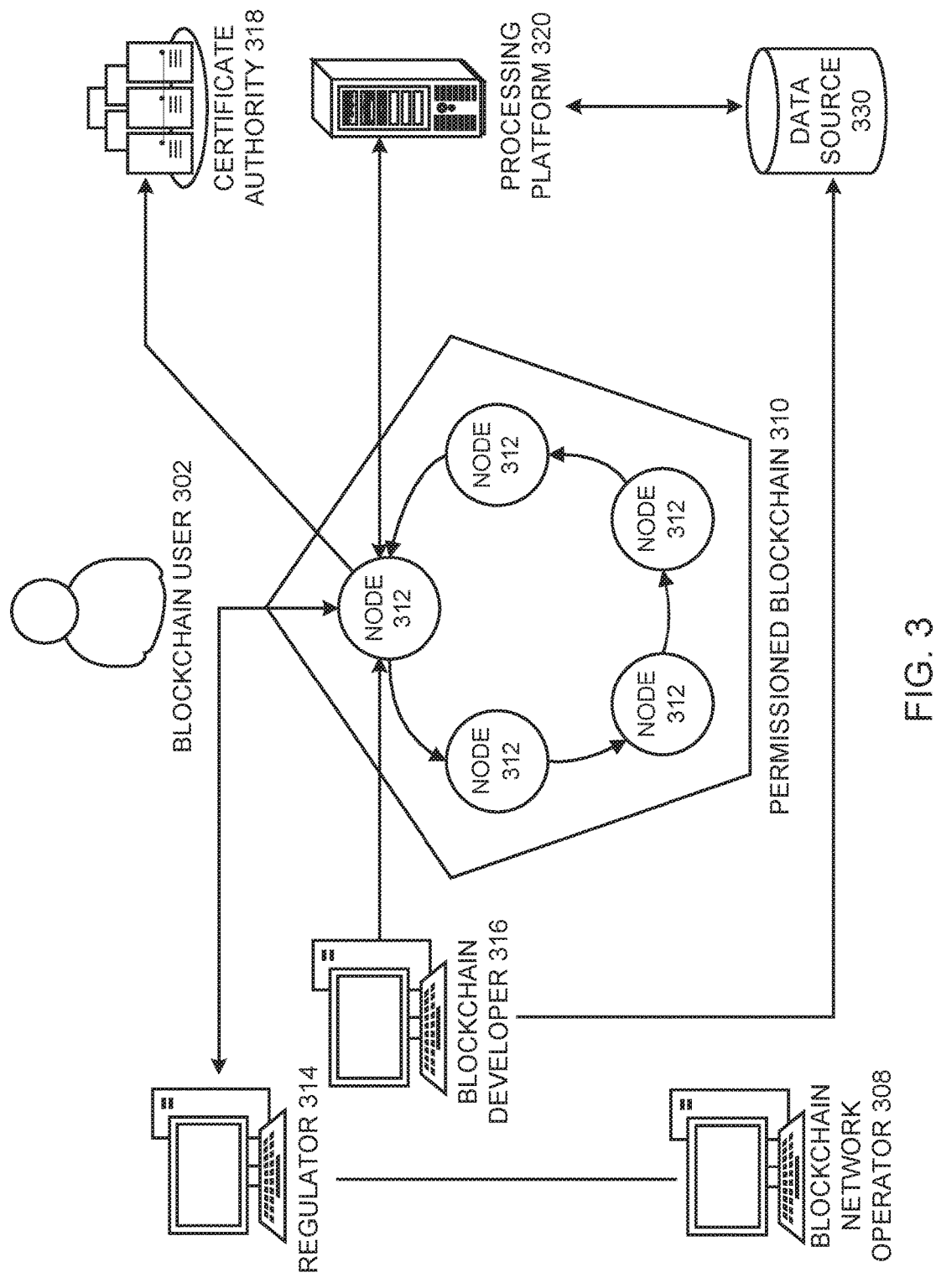
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
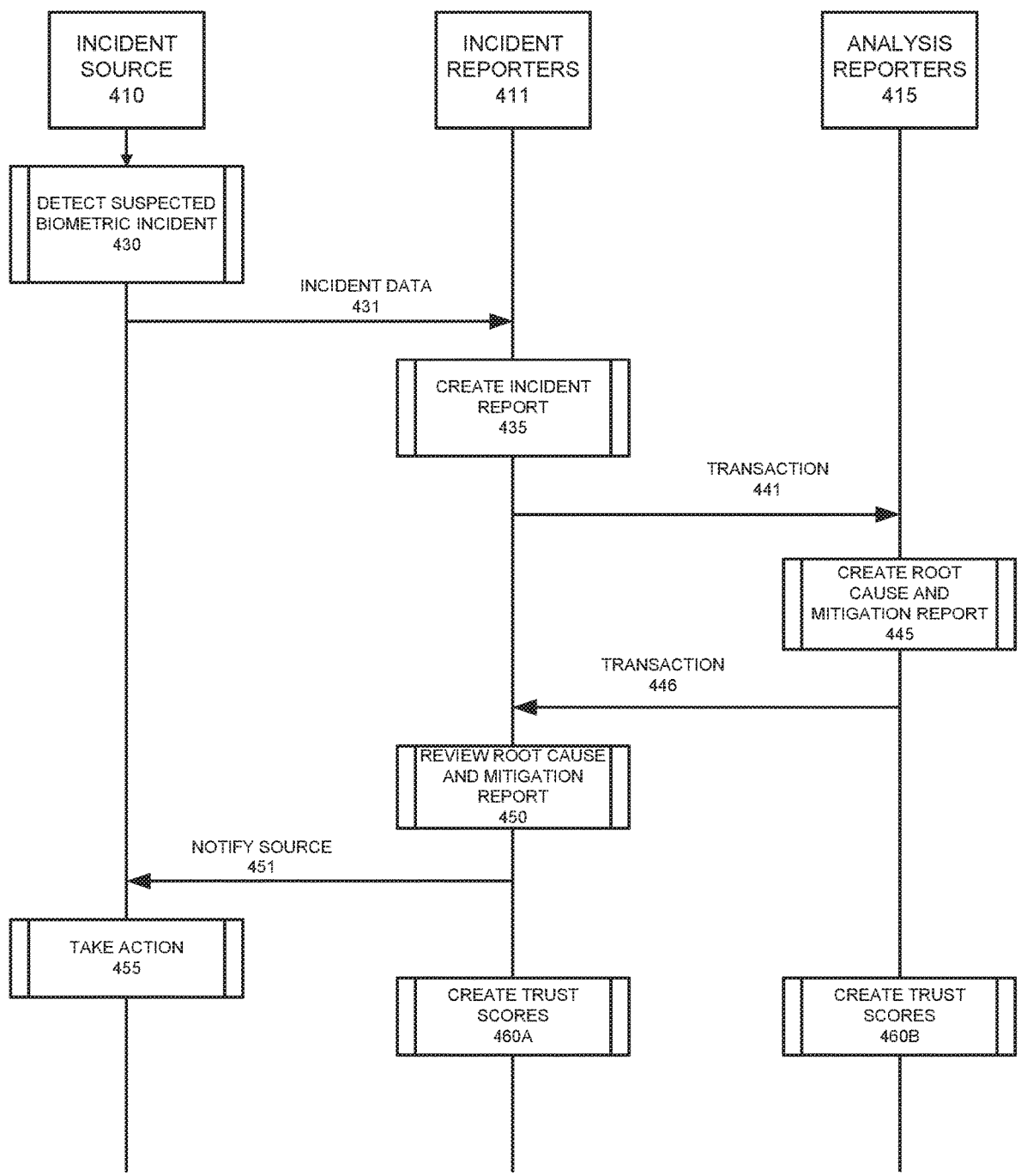
FIG. 4 illustrates a system messaging diagram for performing incident and analysis reporting, according to example embodiments.

FIG. 4 illustrates a system messaging diagram for performing incident and analysis reporting, according to example embodiments. Referring to FIG. 4, the system diagram 400 includes an incident source 410, one or more incident reporters 411, and one or more analysis reporters 415. The incident source 410 is an organization that experienced a suspected biometric authorization incident. In one embodiment, the incident source 410 is a blockchain node 104 of a blockchain network 112. In another embodiment, the incident source 410 is not blockchain node 104 of a blockchain network 112, and is external to the blockchain network 112. The incident reporters 411 and analysis reporters 415 are blockchain nodes 104 of the blockchain network 112 tasked with creating incident reports 144 (first reports) and root cause analysis reports 156 and/or mitigation reports 160 and/or action taken reports 164 and/or threat alerts or recommendations or trust scores 168 (second reports).

The incident source 410 detects a suspected biometric authorization incident 430. The suspected incident occurs while a user is attempting to authenticate some action associated with the incident source 410, and the suspicion is the biometric authorization attempt may be fraudulent in nature. The incident source 410 utilizes biometric equipment (i.e. sensor(s) and computers 128) and/or software and applications provided by one or more biometric vendors to perform biometric authorization activities. Following detecting the suspected biometric authorization incident 430, the incident source 410 provides incident data 431 to the one or more incident reporters 411. In one embodiment, the incident source 410 is not part of the blockchain network 112, and provides the incident data 431 to an incident reporter blockchain node 411 that creates and submits the incident report 435. In another embodiment, the incident source 410 is not part of the blockchain network 112, and provides the incident data 431 to a first incident reporter blockchain node 411 that does not create the incident report 435. The first incident reporter blockchain node 411 then provides the incident data 431 to a second incident reporter blockchain node 411 that creates and submits the incident report 435. In another embodiment, the incident source 410 is part of the blockchain network 112, and is also an incident reporter 411. In that case, the incident source 410 creates and submits the incident report 435 itself. In yet another embodiment, the incident source 410 is part of the blockchain network 112, but does not create and submit the incident report 435. In that case, the incident source 410 provides the incident data 431 to an incident reporter blockchain node 411 that creates and submits the incident report 435.

The incident report 435 may include a number of fields and the individual fields may have different access permissions. The incident report 435 may also include a hierarchical data model (public 148 vs. private 152 data) in order to ensure anonymity & privacy. A hierarchical data model is one in which the data is organized into a tree/graph-like structure. The data is stored as records which are connected to one another through links. Access control or information sharing could be restricted specific nodes 104/layers/leaves in the tree/graph. For example, in an incident report 435, the name of the affected organization 410 may be at the root of the tree, which may be visible only to a selected set of nodes or participants 104 in the blockchain network 112, while the details about the incident could be at the leaves of the tree and may be publicly available to all participants or nodes 104. The vendor of the biometric system under attack may be able to view all the fields (including private data 152), whereas a competitor to the biometric vendor may have access to only a subset of the fields (public data 148) that do not reveal any sensitive information.

Once an incident reporter 411 blockchain node creates the incident or first report, the incident reporter 411 submits a transaction 441 including the incident/first report to the blockchain. The transaction 441 is validated and added to the shared ledger 108. The incident reporter 411 also uses chaincode and/or an application programming interface (API) layer to determine which blockchain nodes 104 may be interested in the incident report 435, and sends a notification to those blockchain nodes 104 that the incident report 435 is available on the blockchain.

The blockchain network 112 includes one or more blockchain nodes 104 that are analysis reporters 415. Analysis reporters 415 include biometric vendors and third party security companies having the resources and skills to analyze the incident report 435, and provide root cause and/or mitigation analysis in order to reduce future suspected biometric authorization attempts. The analysis reporters 415 create root cause and/or mitigation reports (second reports), and submit the second reports as blockchain transactions 446 to the blockchain network 112. In addition to submitting the transaction 446, the analysis reporters 415 also notify incident reporters 411 of the availability of the second report, and in response the incident reports 411 review the root cause and/or mitigation report 450 and may provide the report 455 to the incident source 410 as a notification 451. Although all the nodes 104 in the blockchain network 112 have access to the same root cause and mitigation reports 445, some parts of these reports may be encrypted, and only the nodes 104 having the proper decryption keys could read these parts of the reports 445.

Finally, the incident source 410 and/or incident reporters 116, using chaincodes and/or an API layer, takes one or more actions 455 based on the recommendations in the root cause and/or mitigation report 445. Members of the blockchain network 112 can also share possible countermeasures or recommendations to mitigate the threat, through the shared ledger 108. The proposed solution may require extensive use of the concept of channels (e.g., an incident involving a fingerprint sensor system may not be interesting to an iris sensor vendor, a countermeasure applicable for a particular sensor may not be applicable to other sensors, etc). Channels may involve any appropriate grouping of participants or nodes 104 in a blockchain network 112. For example, all the biometrics-enabled banks could form a channel. All government-linked organizations (e.g., air, sea, and land ports) could form a channel.

Following creation of the first and second reports (incident report 435 and root cause and/or mitigation report 445, respectively), the incident reporters 411 and analysis reporters 415 may each create trust scores 460A and 460B, respectively. Trust scores 460A, 460B may be computed based on the details of the attack specified in the incident report 435. For example, if organization A 410 claims that its fingerprint recognition system has been subjected to fake finger attacks, the incident report 435 will contain details of the attacks such as images, timestamps, match scores, system settings, etc. Based on this information, the biometric vendor providing the biometric system used (as an analysis reporter 415) can evaluate whether the claimed attack is plausible, or not. In this case, the biometric vendor will increase the trust score for organization A 410. On the other hand, if the biometric vendor believes that the attack described by organization A 410 was not feasible, it will reduce the trust score of organization A 410. Trust scores 460A, 460B may also be computed for all the other participants or nodes in the blockchain network 112. For instance, the trust score 460 for a biometric vendor could be computed based on the timeliness and completeness of the root cause reports 445 and the effectiveness of the mitigation steps proposed by them. Similarly, trust scores 460 for third-party agencies could be based on the timeliness and completeness of the alerts issued by them 445 and the effectiveness of the recommendations suggested by them. Assigning trust scores 460 in an anonymous fashion could be done in a way similar to how transfer of coins occurs in public blockchains (e.g., BitCoin). In other words, any organization can anonymously "receive" trust scores 460 and prove their trust scores 460 to other blockchain participants or nodes 104 without revealing their identity as well as that of their scorers.

Figure 5A:
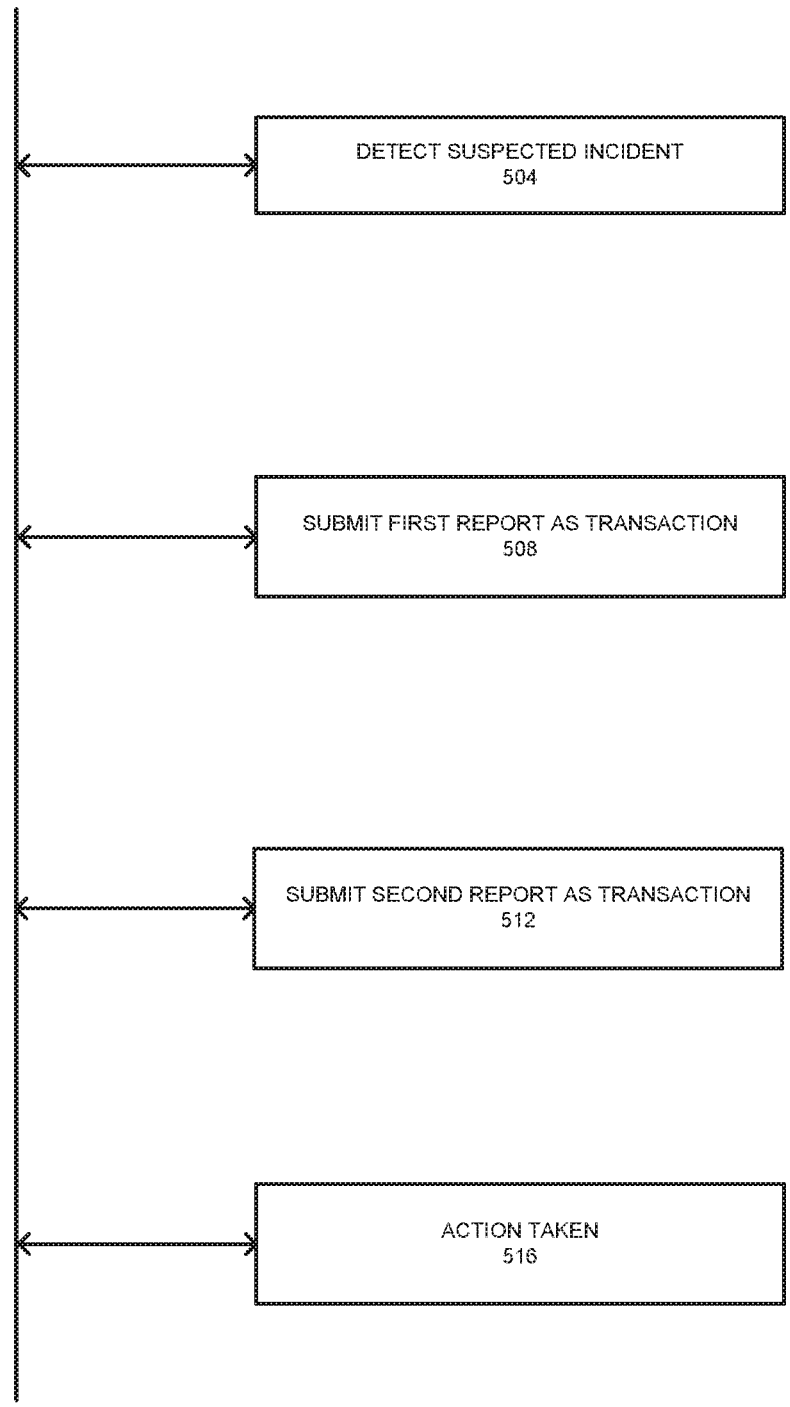
FIG. 5A illustrates a flow diagram of an example method of processing a suspected biometric authorization incident in a blockchain, according to example embodiments.

FIG. 5A illustrates a flow diagram 500 of an example method of processing a suspected biometric authorization incident in a blockchain, according to example embodiments. Referring to FIG. 5A, the method 500 may include detecting a suspected incident 504, where the suspected incident is one for which there is reasonable evidence to believe that an adversary is attempting to circumvent a biometric system. An example is an adversary attempting to fool the system using a fake finger (fingerprint recognition) or a face mask (facial recognition). Another example is replay of an identical biometric sample for multiple authentication attempts. While a single biometric mismatch will not fall under a "suspected incident", multiple biometric mismatches for the same identity within a short period of time could indicate a "suspected incident".

In response to detecting the suspected biometric incident, a first report is created and submitted to a blockchain network 112 as a transaction 508. The first report, or shared incident report, includes public and private data corresponding to the suspected biometric authentication incident. Public data includes non-sensitive incident details, while private data includes sensitive incident details. Sensitive incident details may include one or more of an organization name that received the suspected biometric incident or a biometric vendor name of a supplier who provided all or part of an attached biometric system. The first report may contain a number of fields and the individual fields may have different access permissions. The first report is prepared and submitted by a blockchain node 104 corresponding to the organization that received the suspected biometric incident, or receiving incident details from an organization outside the blockchain network 112 that received the suspected biometric incident (i.e. as a proxy). The submitting blockchain node 104 also notifies affected parties of the blockchain network 112 that the first report is available on the blockchain.

Once the affected parties have been notified of the first report availability, a second report is prepared and submitted to the blockchain network 112 as a transaction 512. The affected parties generally include biometric vendors and third-party security companies. The second report includes one or more of a root cause for the suspected biometric incident and mitigation steps for future biometric incidents based on analysis of the first report. Nodes receiving the shared incident report can analyze the incident independently and come up with an independent assessment of the threat level posed by the incident. Members of the blockchain network 112 can also share possible countermeasures or recommendations to mitigate the threat. The proposed solution may require extensive use of the concept of channels (e.g., an incident involving fingerprint system may not be interesting to an iris vendor, a countermeasure applicable for a particular sensor may not be applicable to other sensors). In one embodiment, blockchain nodes 104 that submit the second report to the blockchain notify other nodes of the blockchain network of the availability of the second report.

Once the second report has been submitted to the blockchain, other blockchain nodes 104 review the second report and take one or more actions 516 based on the first and second reports. For example, such actions may include, but are not limited to replacing or upgrading a biometric system at the affected organization, changing biometric vendors, changing internal processes or procedures, or replacing biometric system with a different non-biometric form of security. In this way, the affected organization benefits from the analysis and recommendations of related experts, without compromising sensitive private data 152. Furthermore, by using an immutable blockchain distributed ledger 108, a permanent series of records for all incidents is available, which may provide better root cause and mitigation for future incidents by considering the circumstances and details of current and previous incidents.

Figure 5B:
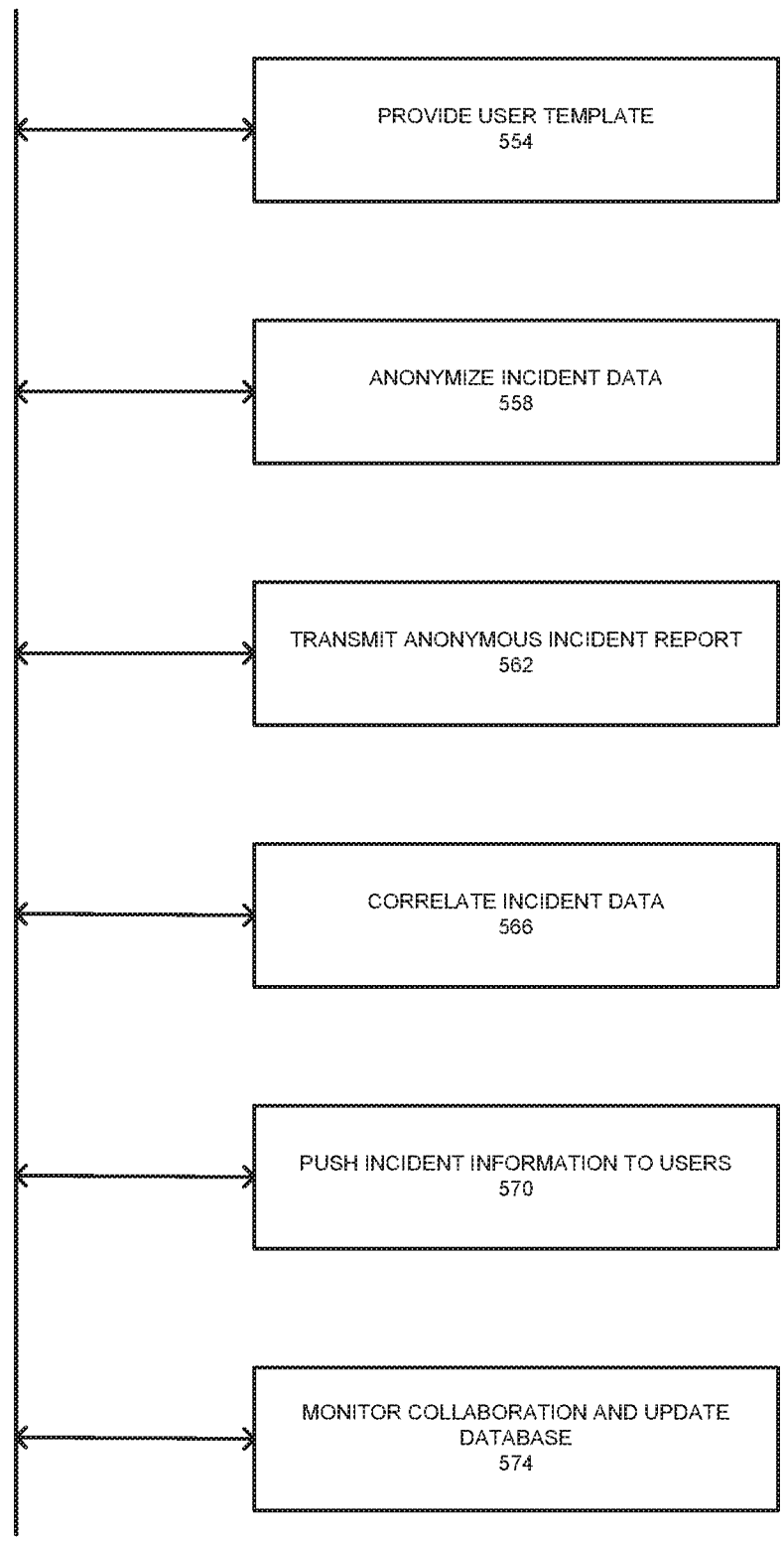
FIG. 5B illustrates a flow diagram of an example method of an anonymous information sharing service, according to example embodiments.

FIG. 5B illustrates a flow diagram 550 of an example method of an anonymous information sharing service, according to example embodiments. The method may include a user template provided to the user in block 554. The user template may be provided to the user when a user joins the anonymous information sharing service. The user template may be provided through various suitable means, such as, for example, an application downloaded onto the user's device. In some embodiments, upon joining the anonymous information sharing service, a software application or module may be installed on a user device to facilitate the anonymous information sharing service. This software or module may be configured to execute one or more functions to implement the anonymous information sharing service. The user may include information such as company name, facility names, alias names of the company or facilities, Internet Protocol address ranges, telephone number ranges, product names and aliases, personnel names, email domains, and any other terms or information the user would like to incorporate into the user template and anonymize in any submitted incident reports. Next, the incident data is anonymized 558, and included in a transmitted incident report 562. The user template may be stored in the user device, and is not transmitted over network(s) so that only the user is in possession of the user template and any data the user would like to anonymize.

Next, whenever the user logs in to access the anonymous information sharing service to report incident data, the user may be authenticated in an anonymous manner to correlate the incident data 566 and the incident data to be reported may be anonymized using a user template of the user who is logged in. The anonymized incident report is then provided to one or more users 570, collaboration between the users is monitored 574 to obtain additional information, and the additional information is used to update a database.

Figure 6A:
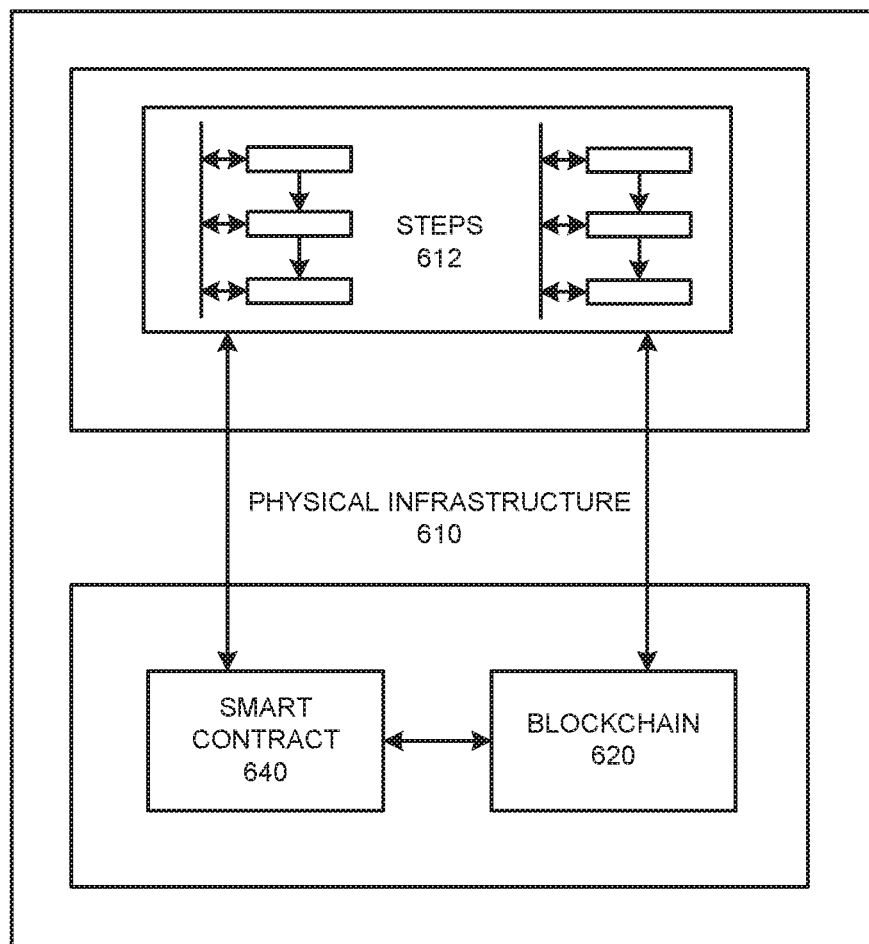
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
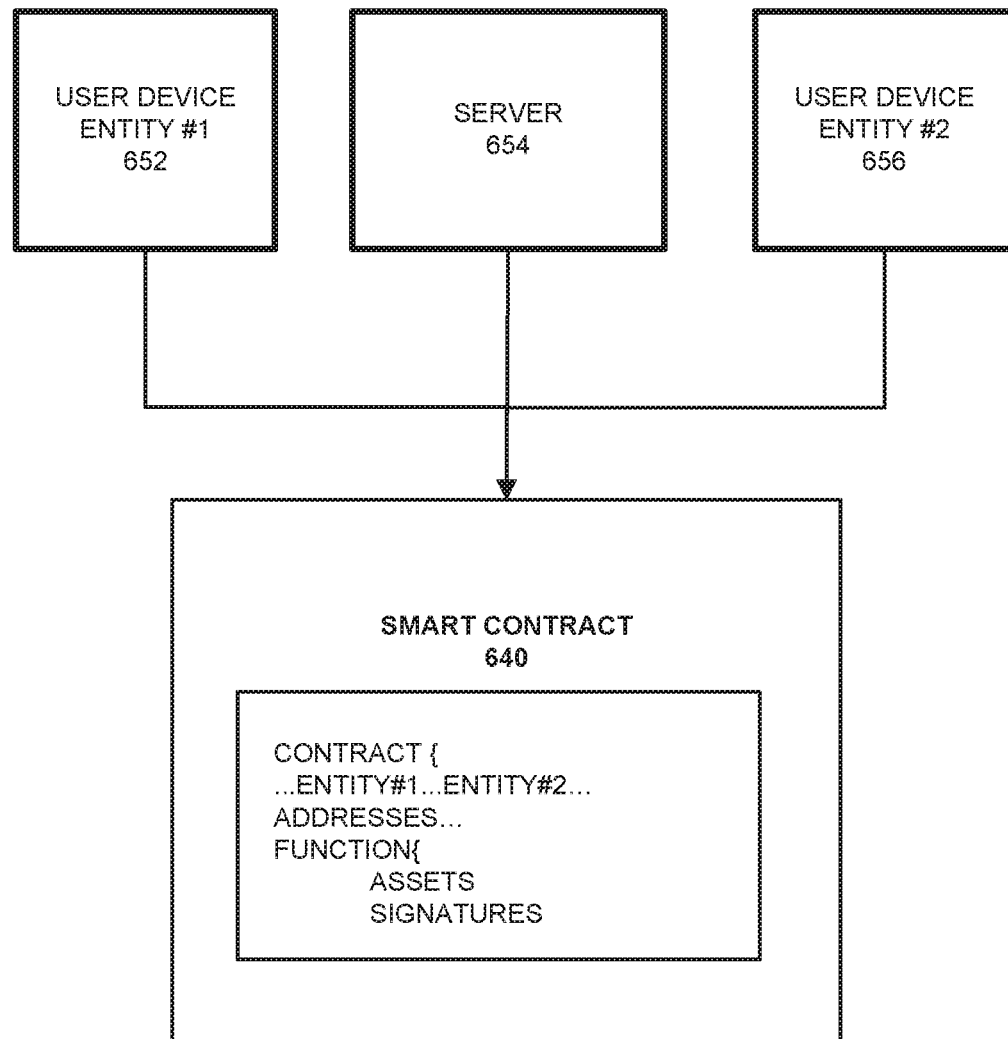
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
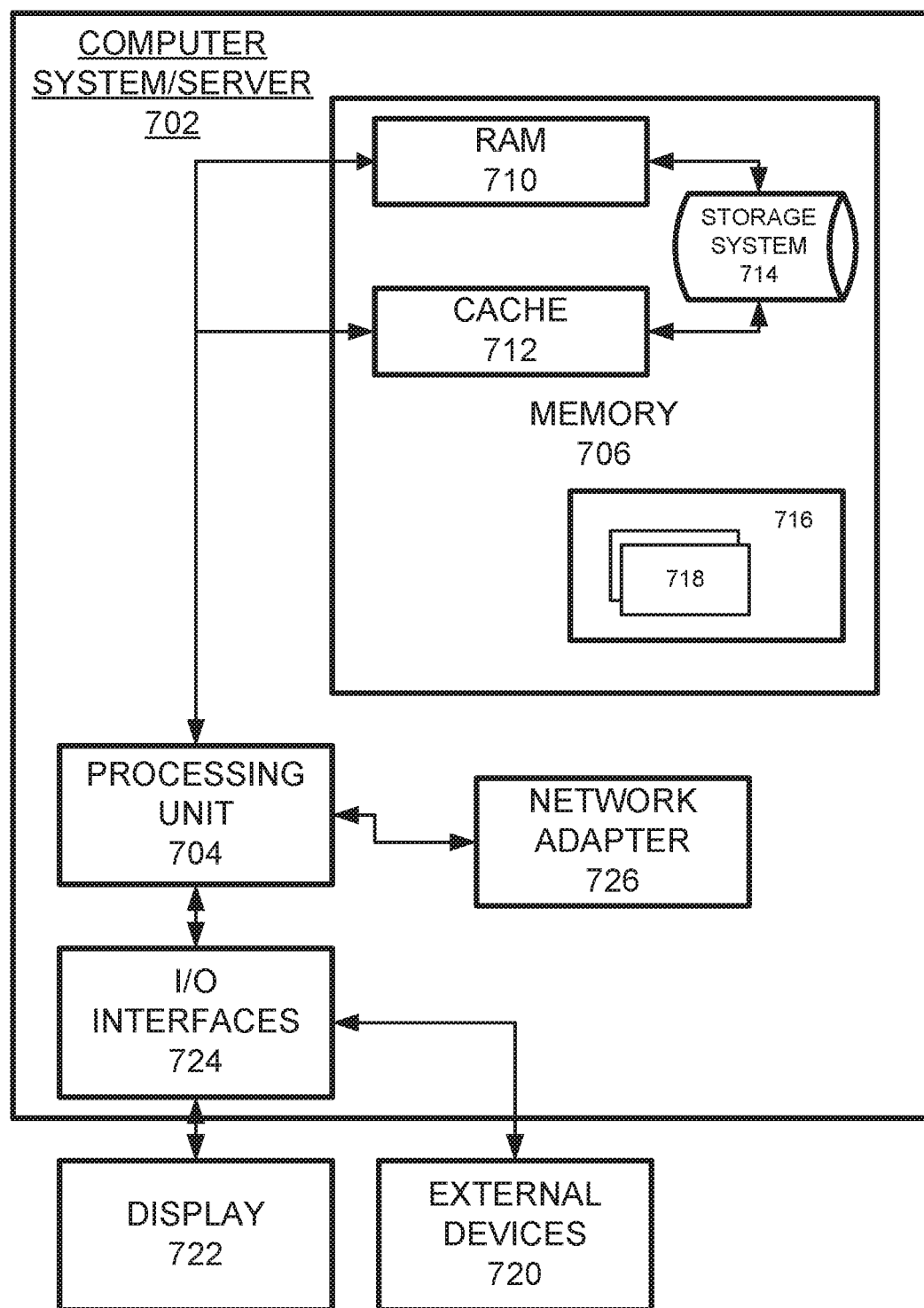
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   detecting a suspected biometric authentication incident;
   submitting a first blockchain transaction comprising a first report to a blockchain network, the first report comprising public and private data corresponding to the suspected biometric authentication incident;
   submitting a second blockchain transaction comprising a second report to the blockchain network, the second report comprising one or more of a root cause and mitigation steps for the incident; and taking an action, by one or more blockchain nodes, in response to determining one or more of the first and second reports are relevant to the one or more blockchain nodes.

2. The method of claim 1, wherein each blockchain node comprises a distributed blockchain ledger, the distributed blockchain ledger comprising the first and second reports and one or more of actions taken reports, general threat alerts, and recommendations.

3. The method of claim 1, wherein prior to detecting the suspected biometric authentication incident, the method further comprising:
creating the blockchain network comprising the one or more blockchain nodes, wherein the one or more blockchain nodes comprises one or more biometric vendors, organizations with deployed biometric systems, security intelligence organizations, and law enforcement or regulatory organizations.

4. The method of claim 3, wherein the private data comprises one or more of a name of an organization that detected the suspected biometric authentication incident and an identification of a biometric vendor, wherein only the organization that detected the suspected biometric authentication incident and the identified biometric vendor are able to read the private data, wherein the identified biometric vendor is associated with the suspected biometric authentication incident.

5. The method of claim 4, wherein an organization outside the blockchain network detects the suspected biometric authentication incident and in response notifies the biometric vendor of the incident and the biometric vendor submits the first report.

6. The method of claim 3, further comprising:
calculating, by the one or more biometric vendors, a trust score based on the first report, the trust score reflecting a perceived plausibility of the incident; and
distributing the trust score to the blockchain network.

7. The method of claim 3, wherein the public data comprises incident details available to all nodes of the blockchain network, wherein the action is taken to reduce or mitigate a chance of a successful future biometric authentication incident.

8. A system, comprising:
a blockchain network, comprising:
a first blockchain node, configured to:
detect a suspected biometric authentication incident;
submit a first blockchain transaction comprising a first report to the blockchain network, the first report comprising public and private data that corresponds to the suspected biometric authentication incident; and
take an action, in response to a determination of one or more of the first and a second report are relevant to the first blockchain node; and
a second blockchain node, configured to:
submit a second blockchain transaction comprising the second report to the blockchain network, the second report comprising one or more of a root cause and mitigation steps for the incident.

9. The system of claim 8, wherein each blockchain node comprises a distributed blockchain ledger, the distributed blockchain ledger comprising the first and second reports and one or more of actions taken reports, general threat alerts, and recommendations.

10. The system of claim 8, wherein the first and second blockchain nodes comprises one or more of biometric vendors, organizations with deployed biometric systems, security intelligence organizations, and law enforcement or regulatory organizations.

11. The system of claim 10, wherein the private data comprises one or more of a name of an organization that detected the suspected biometric authentication incident and an identification of a biometric vendor, wherein only the organization that detected the suspected biometric authentication incident and the identified biometric vendor are able to read the private data, wherein the identified biometric vendor is associated with the suspected biometric authentication incident.

12. The system of claim 11, wherein an organization outside the blockchain network detects the suspected biometric authentication incident and in response notifies the biometric vendor of the incident and the biometric vendor submits the first report.

13. The system of claim 10, wherein a blockchain node of the blockchain network
calculates a trust score based on the first report, the trust score reflecting a perceived plausibility of the incident and distributes the trust score to the blockchain network.

14. The system of claim 10, wherein the public data comprises incident details available to all nodes of the blockchain network, wherein the action is taken to reduce or mitigate a chance of a successful future biometric authentication incident.

15. A non-transitory computer readable medium comprising instructions, that when read by a processor, cause the processor to perform:
detecting a suspected biometric authentication incident;
submitting a first blockchain transaction comprising a first report to a blockchain network, the first report comprising public and private data corresponding to the suspected biometric authentication incident;
submitting a second blockchain transaction comprising a second report to the blockchain network, the second report comprising one or more of a root cause and mitigation steps for the incident; and
taking an action, by one or more blockchain nodes, in response to determining one or more of the first and second reports are relevant to the one or more blockchain nodes.

16. The non-transitory computer readable medium of claim 15, wherein prior to detecting the suspected biometric authentication incident, the processor further configured to perform:
creating the blockchain network comprising the one or more blockchain nodes, wherein the one or more blockchain nodes comprises one or more biometric vendors, organizations with deployed biometric systems, security intelligence organizations, and law enforcement or regulatory organizations.

17. The non-transitory computer readable medium of claim 16, wherein the private data comprises one or more of a name of an organization that detected the suspected biometric authentication incident and an identification of a biometric vendor, wherein only the organization that detected the suspected biometric authentication incident and the identified biometric vendor are able to read the private data, wherein the identified biometric vendor is associated with the suspected biometric authentication incident.

18. The non-transitory computer readable medium of claim 17, wherein an organization outside the blockchain network detects the suspected biometric authentication incident and in response notifies the biometric vendor of the incident and the biometric vendor submits the first report.

19. The non-transitory computer readable medium of claim 16, the processor further configured to perform:
   calculating, by the one or more biometric vendors, a trust score based on the first report, the trust score reflecting a perceived plausibility of the incident; and
   distributing the trust score to the blockchain network.

20. The non-transitory computer readable medium of claim 16, wherein the public data comprises incident details available to all nodes of the blockchain network, wherein the action is taken to reduce or mitigate a chance of a successful future biometric authentication incident.

* * * * *